(12) United States Patent
Miyata et al.

(10) Patent No.: US 11,345,031 B2
(45) Date of Patent: May 31, 2022

(54) METHOD FOR ACQUIRING WELD PASS INFORMATION AND WELDING ROBOT SYSTEM

(71) Applicant: Kobe Steel, Ltd., Kobe (JP)

(72) Inventors: Syunsuke Miyata, Fujisawa (JP); Kenji Sadahiro, Fujisawa (JP); Youzhuo Jiao, Fujisawa (JP); Yuji Kimura, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 34 days.

(21) Appl. No.: 16/486,749

(22) PCT Filed: Feb. 27, 2018

(86) PCT No.: PCT/JP2018/007372
§ 371 (c)(1),
(2) Date: Aug. 16, 2019

(87) PCT Pub. No.: WO2018/173656
PCT Pub. Date: Sep. 27, 2018

(65) Prior Publication Data
US 2019/0375101 A1    Dec. 12, 2019

(30) Foreign Application Priority Data

Mar. 21, 2017   (JP) .............................. JP2017-054687

(51) Int. Cl.
*G05B 19/4097* (2006.01)
*B25J 9/16* (2006.01)
(Continued)

(52) U.S. Cl.
CPC ............. *B25J 9/1664* (2013.01); *B23K 9/127* (2013.01); *B23K 31/003* (2013.01);
(Continued)

(58) Field of Classification Search
CPC .... B25J 9/1664; B25J 15/0019; B25J 9/1666; B23K 9/127; B23K 31/003;
(Continued)

(56) References Cited

U.S. PATENT DOCUMENTS

2012/0029674 A1\* 2/2012 Hida .................. G05B 19/4097
700/98
2012/0116585 A1\* 5/2012 Yoshima ................ B25J 9/1682
700/248

(Continued)

FOREIGN PATENT DOCUMENTS

JP          H06-644 A  *  1/1994  ............. B23K 9/127
JP       10-187223 A       7/1998
(Continued)

OTHER PUBLICATIONS

International Search Report dated May 29, 2018 in PCT/JP2018/007372 filed Feb. 27, 2018.

*Primary Examiner* — Kenneth M Lo
*Assistant Examiner* — Tameem D Siddiquee
(74) *Attorney, Agent, or Firm* — Oblon, McClelland, Maier & Neustadt, L.L.P.

(57) ABSTRACT

This method for acquiring weld pass information pertaining to execution conditions for a weld pass for welding two workpieces, which are to be welded by the welding robot, includes: a step in which a weld pass for welding the two workpieces is extracted from 3D CAD data; a step in which a wall determination model having a predetermined 3D shape is prepared; a step in which the wall determination model is positioned in the direction extending towards the outside of the weld pass, the end of welding which is the starting point or ending point of the weld pass serving as a reference; and a step in which, for the positioned wall determination model, a determination is made as to whether (Continued)

there is interference from a wall surface demarcated by another member different from the two workpieces.

12 Claims, 14 Drawing Sheets

(51) Int. Cl.
*B23K 9/127* (2006.01)
*B23K 31/00* (2006.01)
*B25J 15/00* (2006.01)

(52) U.S. Cl.
CPC ....... *G05B 19/4097* (2013.01); *B25J 15/0019* (2013.01); *G05B 2219/35134* (2013.01); *G05B 2219/45104* (2013.01)

(58) Field of Classification Search
CPC B23K 2101/18; B23K 31/02; B23K 37/0235; B23K 37/0229; G05B 19/4097; G05B 2219/35134; G05B 2219/45104; G05B 2219/35313; Y02P 90/02
See application file for complete search history.

(56) References Cited

U.S. PATENT DOCUMENTS

| 2014/0367365 | A1* | 12/2014 | Zhang | B23K 9/188 |
| | | | | 219/73 |
| 2015/0290801 | A1 | 10/2015 | Kuwahara | |
| 2016/0361775 | A1* | 12/2016 | Collis | B23K 9/23 |

FOREIGN PATENT DOCUMENTS

| JP | 11-291039 A | 10/1999 | |
| JP | 2002-137061 A | 5/2002 | |
| JP | 2007-187223 A | 7/2007 | |
| JP | 2007-272309 A | 10/2007 | |
| JP | 2010-184278 A | 8/2010 | |
| JP | 2015-202523 A | 11/2015 | |
| JP | 2000094131 | * 4/2020 | ............ B23K 9/127 |

\* cited by examiner

FIG. 3
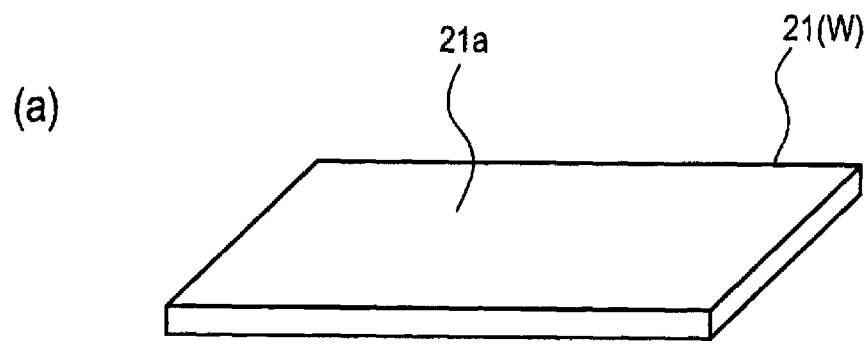
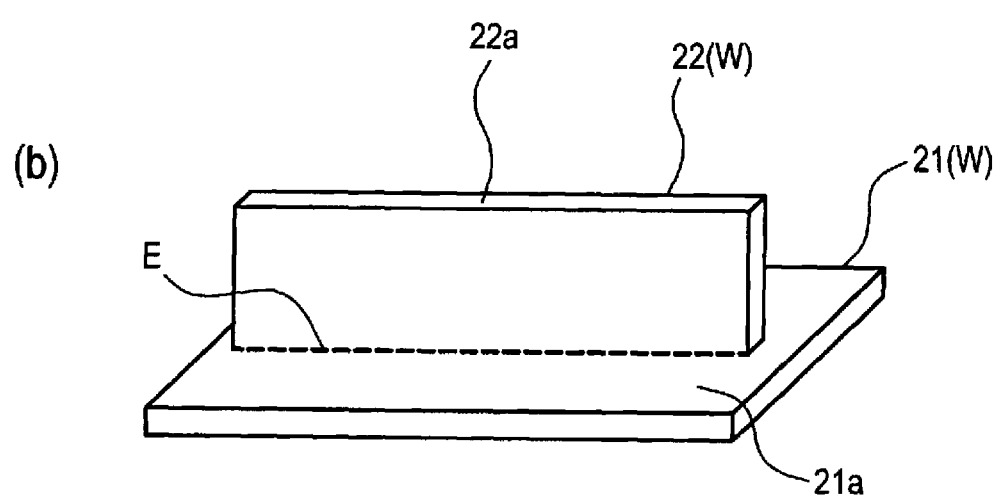

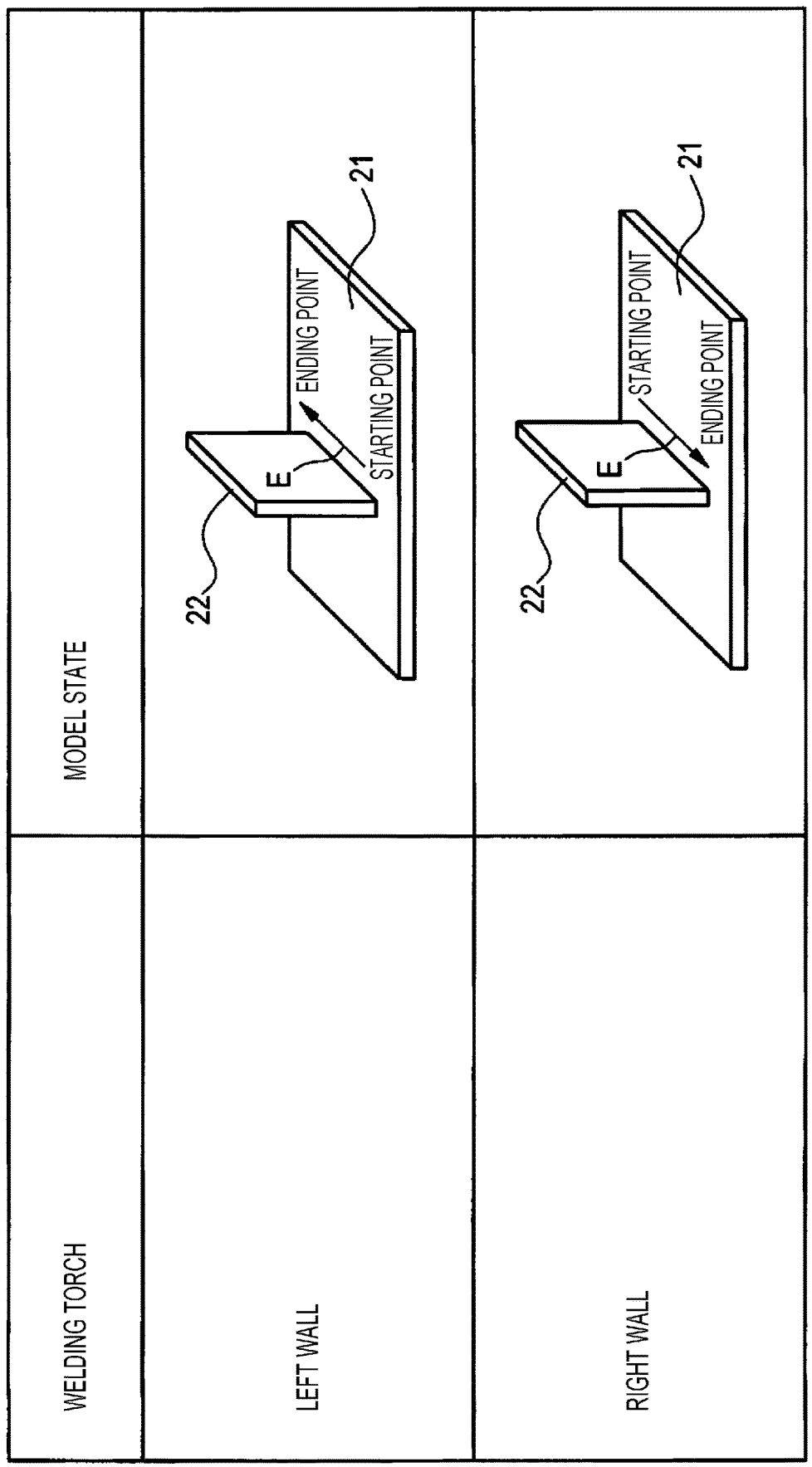

METHOD FOR ACQUIRING WELD PASS INFORMATION AND WELDING ROBOT SYSTEM

CROSS-REFERENCE TO RELATED APPLICATIONS

This application is a United States national stage application of International Application No. PCT/JP2018/007372, filed Feb. 27, 2018, which designates the United States, and claims priority to Japanese Patent Application No. 2017-054687, filed Mar. 21, 2017, and the entire contents of each of the above applications are hereby incorporated herein by reference in entirety.

TECHNICAL FIELD

The present invention relates to a method for acquiring weld pass information pertaining to a weld pass for welding at least two members to be welded, and a welding robot system.

BACKGROUND ART

Nowadays, robots are used in various fields of industry. Such industrial robots include a welding robot as a typical one. For a welding operation, optimal welding conditions have to be set according to each welding object, and a large number of elements, parameters, and combinations thereof are involved in the setting of the welding conditions. Among these, determination of a weld pass (weld line) for welding a member to be welded, which is a welding object, is an important matter.

PTL 1 discloses a weld line generation method for quickly extracting a weld line based on 3D CAD data constituted by many line segments including a weld line candidate. The weld line generation method includes a step in which a surface (a first surface), serving as a reference, between two surfaces of a member which forms a weld line is designated; a step in which the other surface (a second surface that is a groove surface) between the two surfaces of the member which forms the weld line is designated; a step in which a ridgeline is extracted; a step in which a weldable ridgeline section is selected; a step in which weldable ridgelines are integrated and weld line information is generated; and a step in which the weld line information is corrected according to a groove shape.

PTL 2 discloses a teaching system that facilitates teaching operation to a robot. The teaching system includes an image generation unit, a starting point designation unit, a via point designation unit, and a generation unit. The image generation unit generates a virtual image including a closed processing line set on a member to be welded, which is an object for processing by a robot. The starting point designation unit designates a starting point at a position other than the processing line on the virtual image. The via point designation unit designates a via point on the processing line. The generation unit generates teach data to a robot for a path following a processing line from a starting point via the via point and returning again to the via point.

CITATION LIST

Patent Literature

PTL 1: Japanese Unexamined Patent Application Publication No. 2010-184278
PTL 2: Japanese Unexamined Patent Application Publication No. 2015-202523

SUMMARY OF INVENTION

Technical Problem

Meanwhile, in many cases, a problem arises in a welding operation at weld ends including one end of a member to be welded which is a welding object, and a starting point or an ending point of welding. Another member to be welded or another member may be present at one end of a member to be welded, and these objects may provide an obstruction to a welding operation. However, conventional art including the above-described patent literatures does not present a technique for grasping the situation of one end of a member to be welded in advance, and performing a smooth welding operation.

The present invention relates to a method for acquiring weld pass information and a welding robot system in consideration of information on an object which may interfere with a welding operation pertaining to one end of a member to be welded and a weld end.

Solution to Problem

The present invention provides a method for acquiring weld pass information pertaining to execution conditions for a weld pass for welding two members to be welded which are welding objects of a welding robot, the method including: a step in which a weld pass for welding the two members to be welded is extracted from 3D CAD data; a step in which a wall surface determination model having a predetermined 3D shape is prepared; a step in which the wall surface determination model is positioned in a direction extending towards the outside of the weld pass with a weld end serving as a reference, the weld end being at least one of a starting point and an ending point of the weld pass; and a step in which it is determined whether or not a wall surface interferes with the positioned wall surface determination model, the wall surface being demarcated by another member different from the two members to be welded.

The present invention provides a welding robot system including: a welding robot that welds a member to be welded; a computer that controls an operation of the welding robot in accordance with a predetermined operating program. The computer extracts a weld pass for welding two members to be welded from 3D CAD data; prepares a wall surface determination model having a predetermined 3D shape; positions the wall surface determination model in a direction extending towards the outside of the weld pass with a weld end serving as a reference, the weld end being at least one of a starting point and an ending point of the weld pass; determines whether or not a wall surface interferes with the positioned wall surface determination model, the wall surface being demarcated by another member different from the two members to be welded; and teaches the welding robot the acquired weld pass.

Advantageous Effects of Invention

According to the present invention, it is possible to determine whether or not there is interference of another member in the vicinity of a weld end of a weld pass, and particularly, to make a welding operation at one end of a member to be welded smooth.

BRIEF DESCRIPTION OF DRAWINGS

FIG. 3 illustrates a lower plate, a standing plate which are members to be welded as welding objects, (a) is a perspective view of the lower plate, and (b) is a perspective view of a state in which the standing plate is mounted on the lower plate.

FIG. 5 provides conceptual diagrams illustrating a state for determining whether or not a wall surface is present in the vicinity of one end of a member to be welded as an object which interferes with the member to be welded, (a) illustrates a state in which FIG. 3(b) is seen from the front, (b) illustrates a state in which FIG. 3(b) is seen from the side, and (c) illustrates an example in which one end of the standing plate and one end of the lower plate overlap, and a starting point is positioned at the one end of the standing plate and the one end of the lower plate.

FIG. 7 provides conceptual diagrams illustrating a state for determining whether or not a scallop is present in a wall surface, (a) illustrates a scallop presence/absence determination model, (b) illustrates a state in which FIG. 3(b) is seen from the front when a scallop is not present, (c) illustrates a state in which FIG. 3(b) is seen from the side when a scallop is not present, (d) illustrates a state in which FIG. 3(b) is seen from the front when a scallop is present, and (e) illustrates a state in which FIG. 3(b) is seen from the side when a scallop is present.

FIG. 14 is a table which shows the concept of determining an orientation of two members to be welded with respect to welding torches.

DESCRIPTION OF EMBODIMENTS

Hereinafter, an embodiment of the invention will be described in detail with reference to the accompanying drawings. First, a welding robot system to which the present invention is applied will be described.

Figure 1:
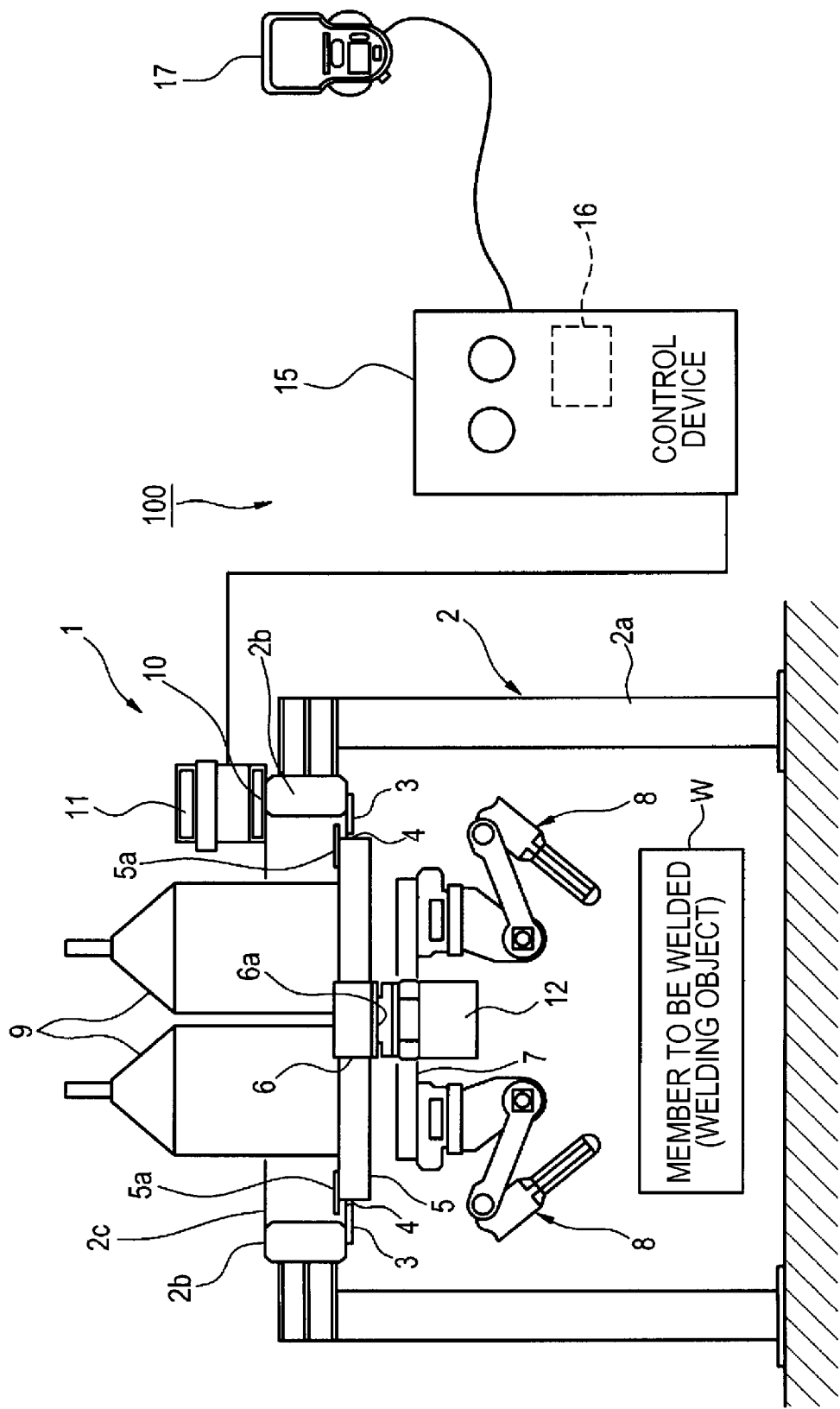
FIG. 1 is a schematic configuration diagram of a welding robot system according to an embodiment of the present invention.

As illustrated in FIG. 1, a welding robot system 100 has a welding robot 1, and a computer that is a control device 15 including a robot pendant 17 used as a teach pendant, for instance.

The welding robot 1 is a twin welding robot device having two welding torches, for instance. The welding robot 1 includes a support frame 2. The column frame 2 includes four columns 2a, a pair of guide support beams 2b installed between top portions of columns 2a with a wide interval among these four columns 2a, and a pair of frames 2c installed between top portions of columns 2a with a narrow interval. The base end side of plate-shaped guide support members 3 projecting in a direction of the opposed guide supporting beams 2b is fixed to the lower surface of the guide support beams 2b, 2b of the support frame 2. Also, linear guides 4 each including a linear guide rail, and a linear guide bearing reciprocatively guided by the linear guide rail is fixed in parallel to the upper surface of these guide support member 3.

A running carriage 5 having the later-described configuration is configured to move reciprocatively by the linear guide bearings of these linear guides 4. That is, a mounting bracket 5a with the base end side fixed to the upper surface of a stand frame is mounted on the linear guide bearing, and the running carriage 5 is configured to move reciprocatively at a position on the inside of the guide support beams 2b, 2b, and in the vicinity of the lower end. That is, the running carriage 5 is configured to move reciprocatively at a position corresponding to the lower stand frame of the running carriage according to a conventional example.

Then, a θ axis frame 6 which houses a θ axis (pivot axis) 6a is mounted at a central position in a width direction of the running carriage 5, and a revolving frame 7 which revolves around the center as a revolving center in a longitudinal direction is horizontally mounted at a projection end from the θ axis frame 6 of the θ axis 6a.

A 6-axis vertical articulated manipulator 8 with a welding torch mounted on its leading end is mounted on each of the lower surfaces of the leading end of the revolving frame 7 so as to be revolvable around a vertical axial center. Also, two wire packs 9, which house wires for welding wound in a coil shape, are mounted on the upper surface of the running carriage 5. Cable bear (registered trademark) 11 for operating the running carriage 5 and the manipulator 8 and supplying electric power for welding is provided on an upper surface 10 of a guide support beam 2b which is one of a pair of the guide support beams 2b.

Although the welding robot 1 is a twin welding robot device having two welding torches in the present embodiment, the type of the welding robot to which the present invention is applied is not particularly limited.

A member W to be welded, which is a welding object of the welding robot 1, is disposed below the welding robot 1, particularly below the manipulator 8 with a welding torch mounted at its leading end, and multiple members W to be welded are welded by the welding torch of the manipulator 8. The members W to be welded are various metal members, and include the later-described lower plate 21, standing plate 22.

Also, the welding robot 1 of the embodiment includes a camera 12 serving as a sensor that captures the member W to be welded. The camera 12 captures the member W to be welded actually disposed, and obtains an image of the member W to be welded. As long as the sensor is capable of capturing the member W to be welded, the type of the sensor is not particularly limited, and the installation position of the sensor is not particularly limited.

The control device 15 acquires execution conditions for a weld pass for welding two members to be welded which are welding objects, particularly, weld pass information pertaining to conditions of an object which may interfere with a welding operation for one end of a member to be welded and a weld end (a starting point or an ending point of a weld pass). The control device 15 is a computer that performs the method for acquiring weld pass information in accordance with a predetermined program, and outputs an operation instruction to the welding robot 1, that is the acquired weld pass in accordance with a program (teach program) which has been taught in advance, thereby controlling the operation of the welding robot 1. The control device 15 includes a control unit 16 comprised of a processor that reads and executes a program, and in addition, a storage device, such as a memory and a hard disk, that stores data. In particular, the control device 15 stores a database of 3D CAD data which is design data for the member W to be welded, and refers to the 3D CAD data when the operation of the welding robot 1 is controlled. The database of the 3D CAD data may be constructed by a server connected to the control device 15 via a network, and the location, format of the database are not particularly limited.

Figure 2:
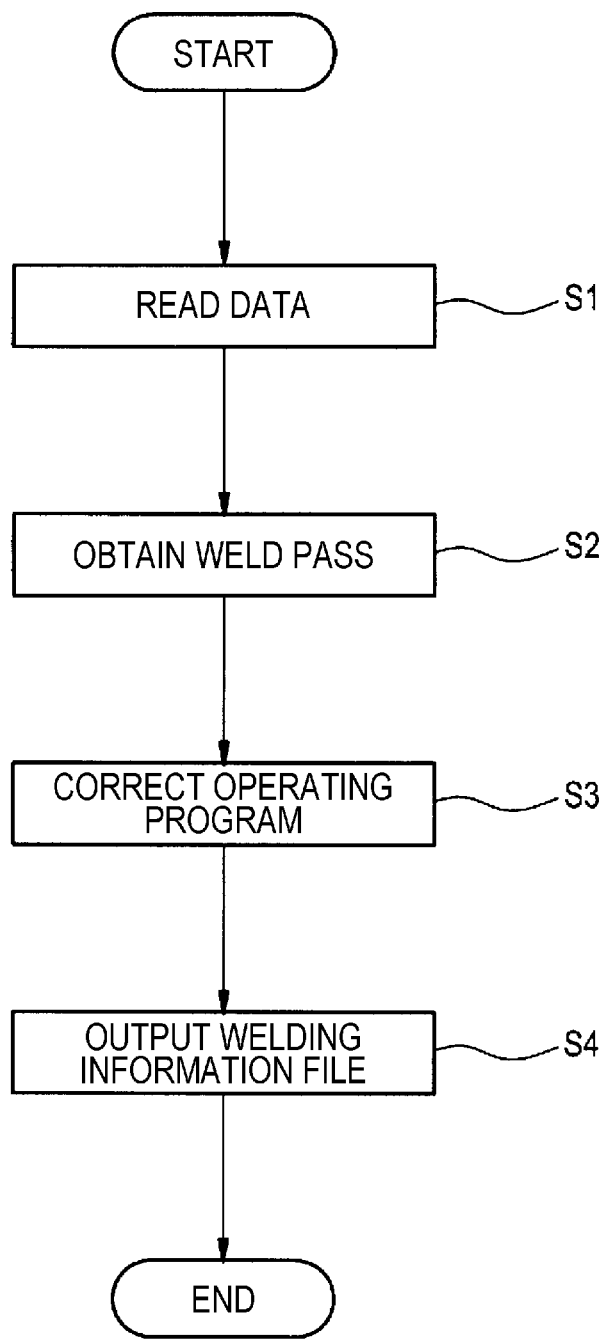
FIG. 2 is a flowchart illustrating the outline of the operation of a control device.

FIG. 2 is a flowchart illustrating the outline of the operation of the control device 15. The control unit 16 of the control device 15 reads the 3D CAD data from a storage device which is not illustrated by an operation of an operator of the welding robot system 100 (step S1). Here, the 3D CAD data of the member W to be welded, which is particularly a welding object, is read. The control unit 16 then acquires a weld pass from the 3D CAD data, the weld pass being a locus of a weld portion at which multiple members W to be welded are welded (step S2). Furthermore, the control unit 16 acquires the coordinates of the member W to be welded from an image of the member W to be welded, captured by the camera 12, compares the coordinates with the coordinates in the original 3D CAD data of the member W to be welded, and corrects an operating program which controls the operation of the welding robot 1 based on the difference (step S3). Finally, the control unit 16 outputs weld information file in which an ultimate operation of the welding robot 1 is recorded (step S4). The welding robot 1 operates in accordance with the weld information file.

In the acquisition of the weld pass in step S2, as illustrated in FIG. 2, the control unit 16 extracts a weld pass for welding two members W to be welded from the 3D CAD data. In the member W to be welded, there is a standing plate 22 (see FIG. 3(*b*)) having one plate thickness surface (a surface corresponding to the thickness of a plate) 22*a* welded to, for instance, a lower plate 21 positioned horizontally, a major surface (the largest surface) 21*a* of the lower plate 21 illustrated in FIG. 3(*a*). As illustrated by a dashed line, a weld pass E which is a path for welding the lower plate 21 and the standing plate 22 is a bonded portion between the major surface of the lower plate 21 and the plate thickness surface of the standing plate 22.

Meanwhile, in many cases, a problem arises in a welding operation at one end of the member W to be welded, which is a welding object. Another member to be welded or another member may be present at one end of the member W to be welded, and these objects may provide an obstruction to a welding operation due to interference with the welding torch of the manipulator 8, for instance. Such information is not necessarily incorporated in the 3D CAD data in advance, and is a cause that interferes with a smooth welding operation.

Thus, in the present invention, weld pass information pertaining to execution conditions for a weld pass for welding two members W to be welded is acquired. More specifically, a special model is positioned at a specific position with a starting point or an ending point of a weld pass serving as a reference, and thereby determines whether or not an object which may provide interference is present. A smooth welding operation is secured by making such a determination in advance.

Figure 4:
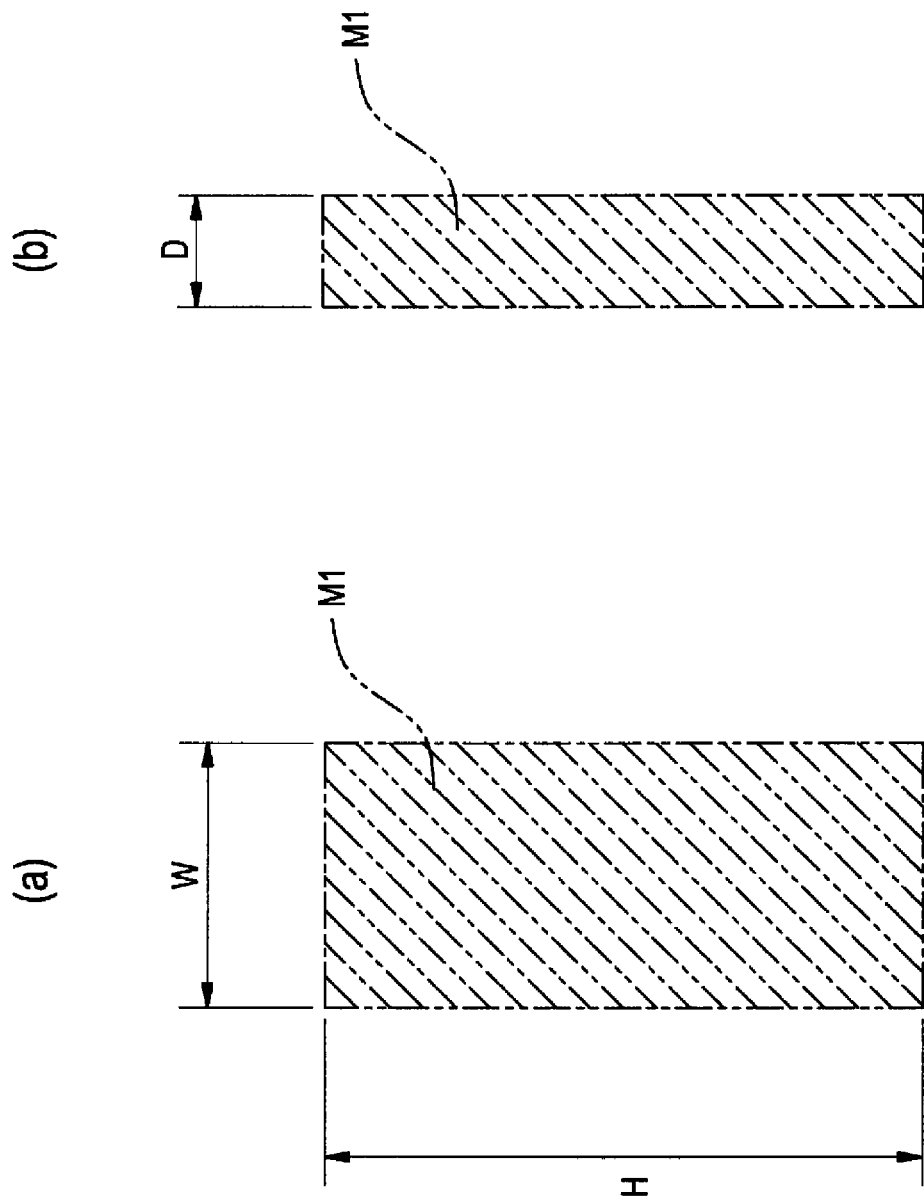
FIG. 4 illustrates a wall surface determination model, (a) is a front view of the wall surface determination model, and (b) is a side view of the wall surface determination model.

FIG. 4 illustrates a wall surface determination model M1 for determining the presence of an object which may provide interference. FIG. 4(*a*) is a front view of the wall surface determination model M1, FIG. 4(*b*) is a side view of the wall surface determination model M1, and the wall surface determination model M1 has a rectangular parallelepiped shape with the size of width W, height H, depth D. The wall surface determination model M1 is not an object actually exists, and is a virtual model prepared in advance in a program which acquires weld pass information. Although the wall surface determination model M1 is a virtual model, interference occurs when another object is positioned in the program in the area where the wall surface determination model M1 is present. The sizes of width W, height H, and depth D are set at will according to the type of the member to be welded. In addition, the shape of the wall surface determination model is not limited to a rectangular parallelepiped, and may be a cube, a sphere, a polygonal column, or another shape which has a predetermined 3D shape.

Figure 5:
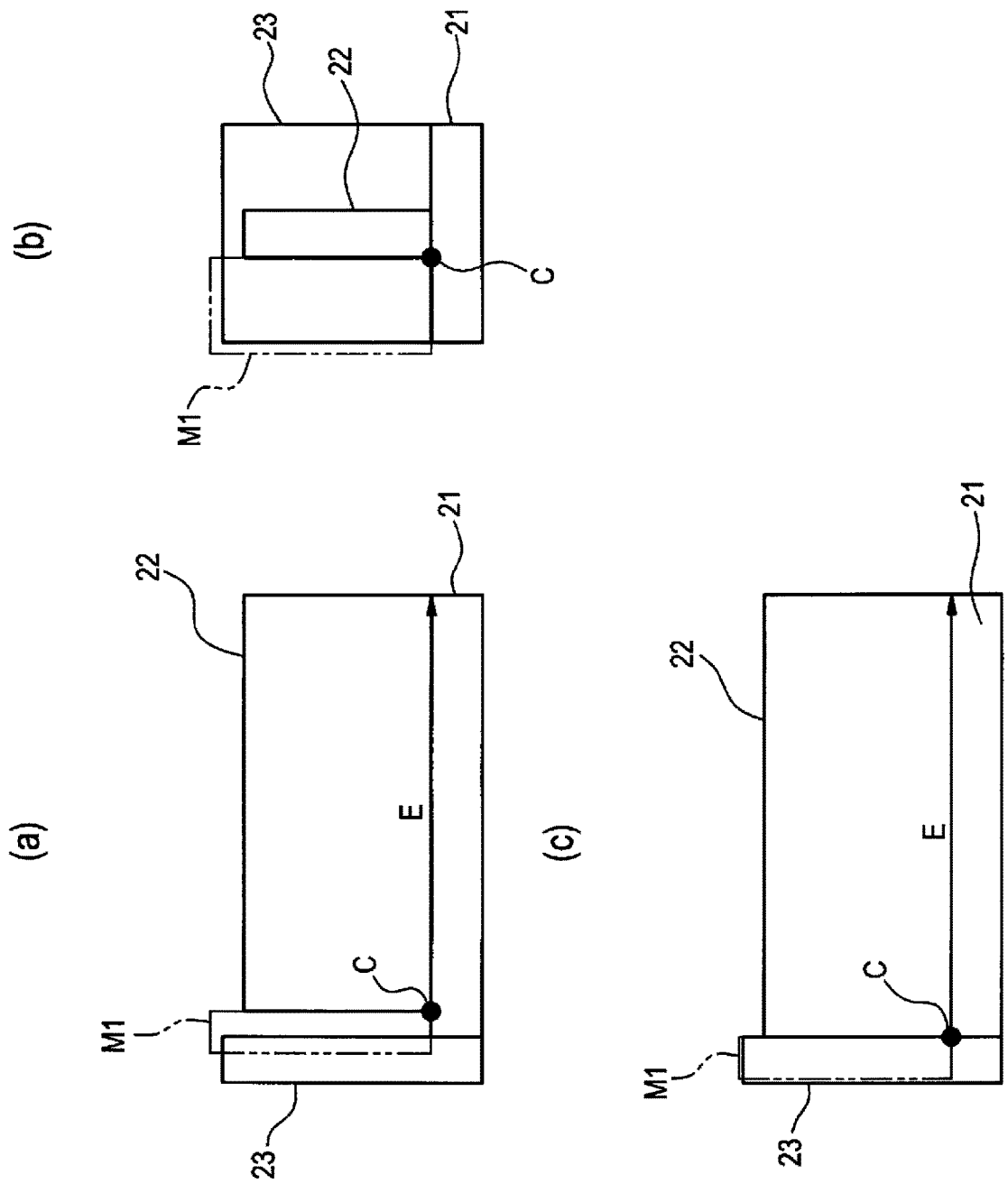

FIG. 5 provides conceptual diagrams illustrating a state for determining whether or not a wall surface 23 is present in the vicinity of one end of a member to be welded as an object which interferes with the member to be welded. Fig. (a) illustrates a state in which FIG. 3(*b*) is seen from the front, Fig. (b) illustrates a state in which FIG. 3(*b*) is seen from the side. The control unit 16 extracts the weld pass E for welding the lower plate 21 and the standing plate 22 at the bonded portion between the lower plate 21 and the standing plate 22 which are two members to be welded. The weld pass E necessarily includes a starting point at which welding is started and an ending point at which welding is ended, and a starting point C is illustrated in FIG. 5. Then, the control unit 16 positions the wall surface determination model M1 in a direction extending towards the outside of the weld pass E as seen from the side of the weld pass E with a weld end of the weld pass E, which is the starting point C, serving as a reference. The control unit 16 determines whether or not the wall surface 23 interferes with thus positioned wall surface determination model M1, the wall surface 23 being demarcated by another member different from the members to be welded which are the lower plate 21, the standing plate 22. In the example of FIGS. 5 (*a*), (*b*), the wall surface determination model M1 positioned in a direction extending towards the outside of the weld pass E from the starting point C interferes with the wall surface 23. As a result, the control unit 16 determines that interference occurs, and notification is made to an operator, for instance, by certain means (such as display by a display), thereby making it possible for an operator to take various measures for smoothing a welding operation at a weld end including the starting point C.

In the example of FIGS. 5 (*a*), (*b*), one end of the standing plate 22 is positioned not at one end of the lower plate 21, but on the inside of the lower plate 21 (at a point within the major surface of the lower plate 21). That is, the starting point C is positioned at one end of the standing plate 22, not at one end of the lower plate 21, but is positioned on the inside (at a point within the major surface of the lower plate 21). In contrast, in the example of FIG. 5(*c*), one end of the standing plate 22 and one end of the lower plate 21 overlap, and the starting point C is positioned at one end of standing plate 22 and the end of the lower plate 21. Also in the example of FIG. 5(*c*), the wall surface determination model M1 positioned in a direction extending towards the outside of the weld pass E from the starting point C interferes with the wall surface 23.

Figure 6:
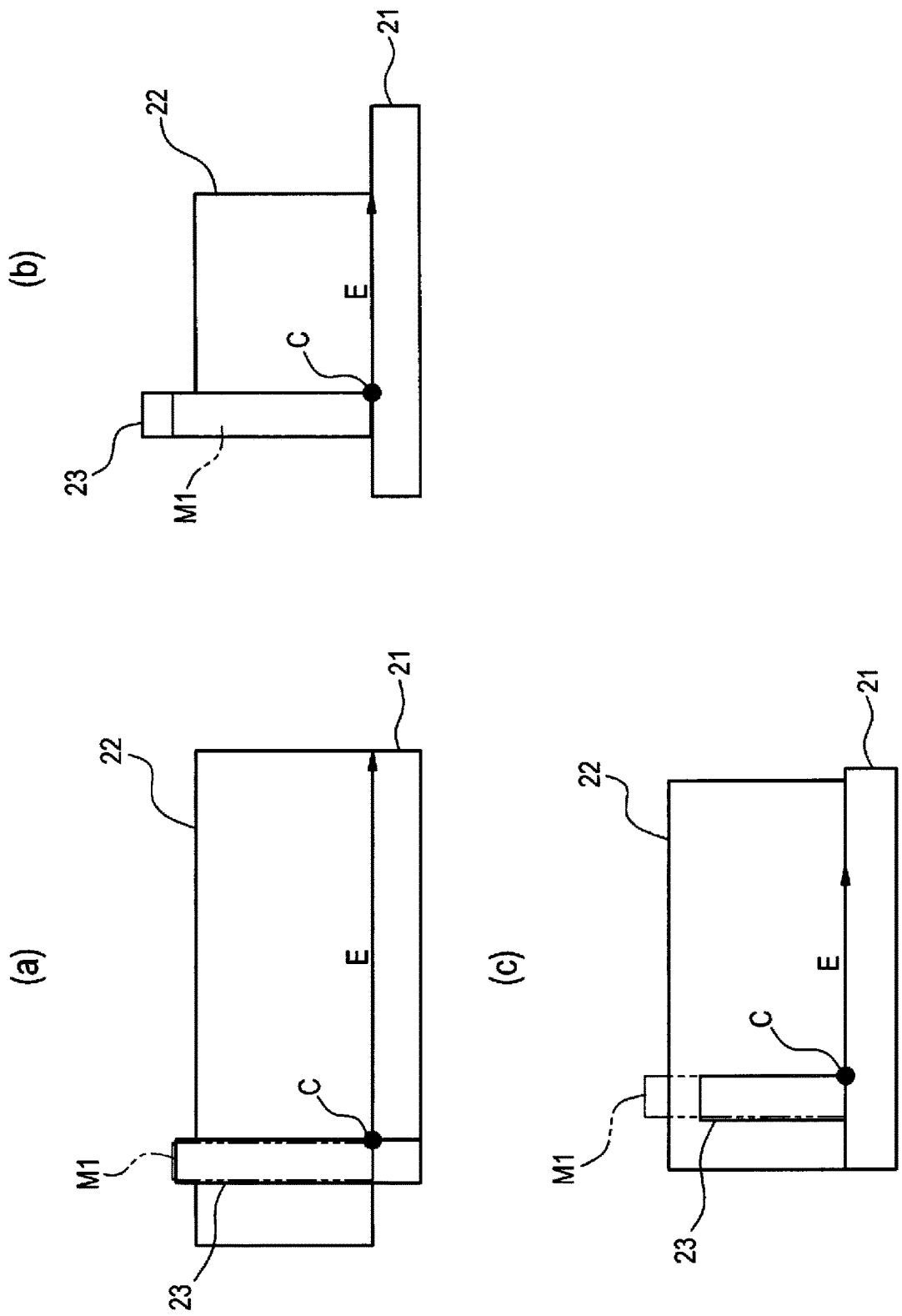
FIG. 6 provides diagrams as continuation of FIG. 5, (a) illustrates an example in which the one end of the standing plate is positioned not at the one end of the lower plate, but on the outside of the lower plate, (b) illustrates an example in which the one end of the standing plate is positioned not at the one end of the lower plate, but on the inside of the lower plate, and (c) illustrates an example in which the one end of the standing plate and the one end of the lower plate overlap.

In the example of FIG. 6(*a*), one end of the standing plate 22 is positioned not at one end of the lower plate 21, but on the outside of the lower plate 21. That is, the starting point C is positioned at one end of the lower plate 21, and on the inside (at a point within the major surface of the lower plate 21) of the standing plate 22. Also in the example of FIG. 5(*c*), the wall surface determination model M1 interferes with the wall surface 23.

In the example of FIG. 6(*b*), one end of the standing plate 22 is positioned not at one end of the lower plate 21, but on the inside (at a point within the major surface of the lower plate 21) of the lower plate 21. That is, the starting point C is positioned at one end of the standing plate 22, not at one end of the lower plate 21, but is positioned on the inside (at a point within the major surface of the lower plate 21). Also in the example of FIG. 6(*b*), the wall surface determination model M1 interferes with the wall surface 23.

In the example of FIG. 6(*c*), one end of the standing plate 22 and one end of the lower plate 21 overlap. However, in contrast to the example of FIG. 5(*c*), the starting point C is positioned on the inside (at a point within the major surfaces of the lower plate 21 and the standing plate 21) of the lower plate 21 and the standing plate 22. Also in the example of FIG. 6(*c*), the wall surface determination model M1 interferes with the wall surface 23.

Figure 7:
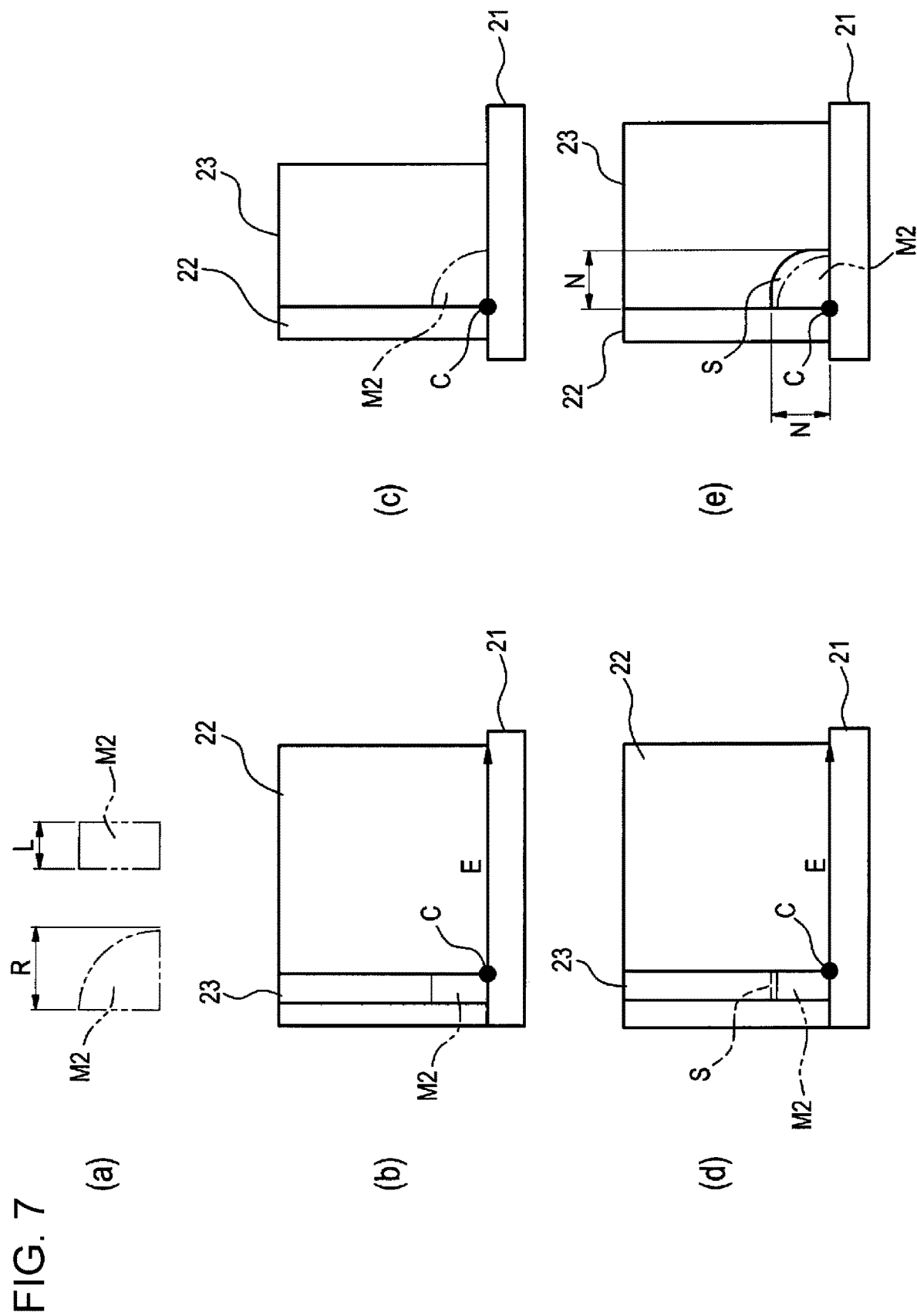

FIG. 7(*a*) illustrates a scallop presence/absence determination model M2 which is another model for determining the presence of an object which may provide interference, and a sectional shape is a fan shape with a radius R and a length L in a longitudinal direction. The scallop is a fan-shaped notch provided in one member to be welded at a portion where two members to be welded intersect, and it can be determined that no scallop is present when the scallop presence/absence determination model M2 and a member to be welded interfere with each other, and a scallop is present when the scallop presence/absence determination model M2 and a member to be welded do not interfere with each other.

After it is determined that the wall surface 23 is present by wall surface determination which determines the presence/absence of a wall surface illustrated in FIG. 5, FIG. 6, the scallop presence/absence determination model M2 is used. That is, after the wall surface 23 demarcated by another member different from the lower plate 21, the standing plate 22 is determined to be interfering with the wall surface determination model M1, scallop presence/absence determination is made for determining whether or not a scallop which penetrates the wall surface 23 is present.

As illustrated in FIG. 7(*a*), the scallop presence/absence determination model M2 having a predetermined 3D shape for determining whether or not a scallop which penetrates the wall surface 23 is present is prepared in advance. Similarly to the wall surface determination model M1, the scallop presence/absence determination model M2 is not an object actually exists, and is a virtual model prepared in advance in a program which acquires weld pass information. Although the scallop presence/absence determination model M2 is a virtual model, interference occurs when no scallop is present in the area where the scallop presence/absence determination model M2 is present in the program. The sizes of radius R, length L are set at will according to the type of the member to be welded. Also, the shape of the scallop presence/absence determination model is not limited to the shape in FIG. 7(*a*), and may be a cube, a sphere, a polygonal column, or another shape which has a predetermined 3D shape.

FIGS. 7(*b*), (*c*) are conceptual diagrams illustrating a state for determining whether or not a scallop is present on the wall surface 23, and illustrate an example of scallop presence/absence determination using the scallop presence/absence determination model M2. FIG. 7(*b*) illustrates a state in which FIG. 3(*b*) is seen from the front, and FIG. 7(*c*) illustrates a state in which FIG. 3(*b*) is seen from the side.

After the presence of the interfering wall surface 23 is identified by the wall surface determination illustrated in FIGS. 5, 6, as illustrated in FIGS. 7(*b*), (*c*), the control unit 16 positions the scallop presence/absence determination model M2 on the side where the wall surface 23 is present with the starting point C, which is a weld end, serving as a reference. The control unit 16 determines whether or not the wall surface 23 interferes with thus positioned presence/absence determination model M2. In the example of FIGS. 7(*b*), (*c*), the scallop presence/absence determination model M2 positioned in a direction extending towards the outside of the weld pass E from the starting point C, that is, on the side where the wall surface 23 is present, interferes with the wall surface 23. As a result, the control unit 16 determines that interference occurs, and notification is made to an operator, for instance, by certain means (such as display by a display), thereby making it possible for an operator to take various measures for smoothing a welding operation at a weld end including the starting point C.

FIGS. 7(*d*), (*e*) illustrate an example in which a scallop S is present in the wall surface 23. The manner of arrangement of the scallop presence/absence determination model M2 is the same as in FIGS. 7(*b*), (*c*). The scallop presence/absence determination model M2 does not interfere with the wall surface 23, the control unit 16 determines that interference occurs, and notification is made to an operator, for instance, by certain means (such as display by a display), thereby making it possible for an operator to take various measures for smoothing a welding operation at a weld end including the starting point C. It is to be noted that the radius R of a cross-section of the scallop presence/absence determination model M2 is set to be smaller than a radius N of a fan-shaped scallop S (R<N).

Figure 8:
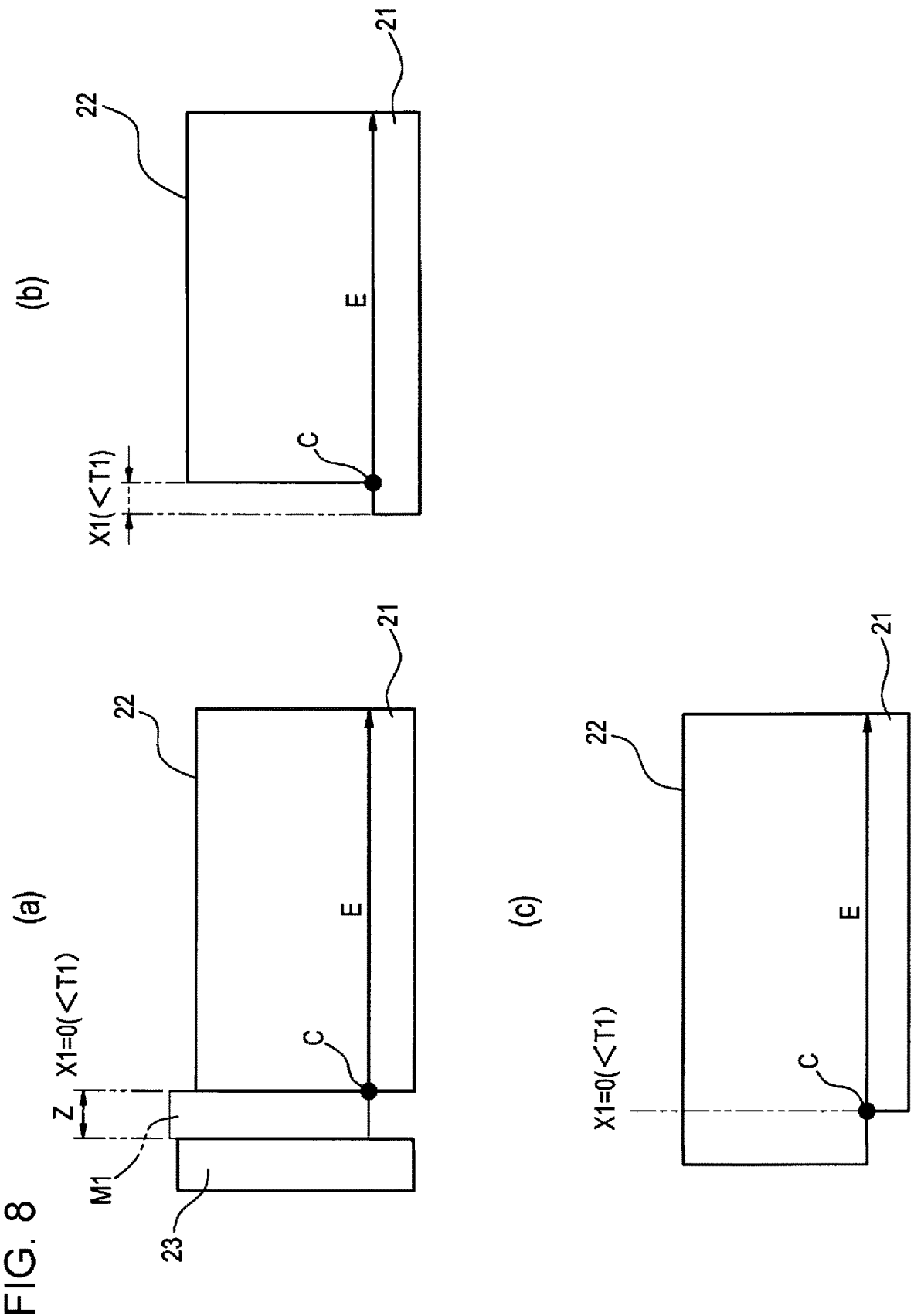
FIG. 8 illustrates conceptual diagrams for lower plate end determination, (a) is an example in which a first distance between the one end of the lower plate and the starting point is 0, (b) is an example in which the one end of the standing plate is present within the major surface of the lower plate, and (c) illustrates an example in which the one end of the standing plate is present on the outside of the lower plate.

FIG. 8 illustrates conceptual diagrams for lower plate end determination which is made after the wall surface 23 interfering with the wall surface determination model M1 is determined to be not present by the wall surface determination which determines the presence/absence of a wall surface illustrated in FIG. 5, FIG. 6. The "lower plate end" means a state in which one end of the standing plate 22 and one end of the lower plate 21 are in a positional relationship of matching or adjacent. As a precondition, as illustrated in FIG. 8(a), a result of the wall surface determination in FIG. 5, FIG. 6 indicates that the wall surface determination model M1 does not interfere with the wall surface 23. A distance Z from one end of the standing plate 22 and one end of the lower plate 21 to the wall surface 23 is greater than a depth D (see FIG. 4(b)) of the wall surface determination model M1 (Z>D).

The control unit 16 measures a first distance X1 between one end (one end) of the lower plate 21 and the starting point C which is a weld end. In the example of FIG. 8(a), X1=0, and in FIGS. 8(b) (c), X1 is illustrated. In FIG. 8(b), one end (one end) of the standing plate 22 is present within the major surface of the lower plate 21, and in FIG. 8(c), one end of the standing plate 22 is present on the outside of the lower plate 21. In either example, the first distance X1 is smaller than a first predetermined value T1 (X1<T1). In this case, the control unit 16 makes the lower plate end determination that one end of the lower plate 21 is considered to match one end of the standing plate 22.

Figure 9:
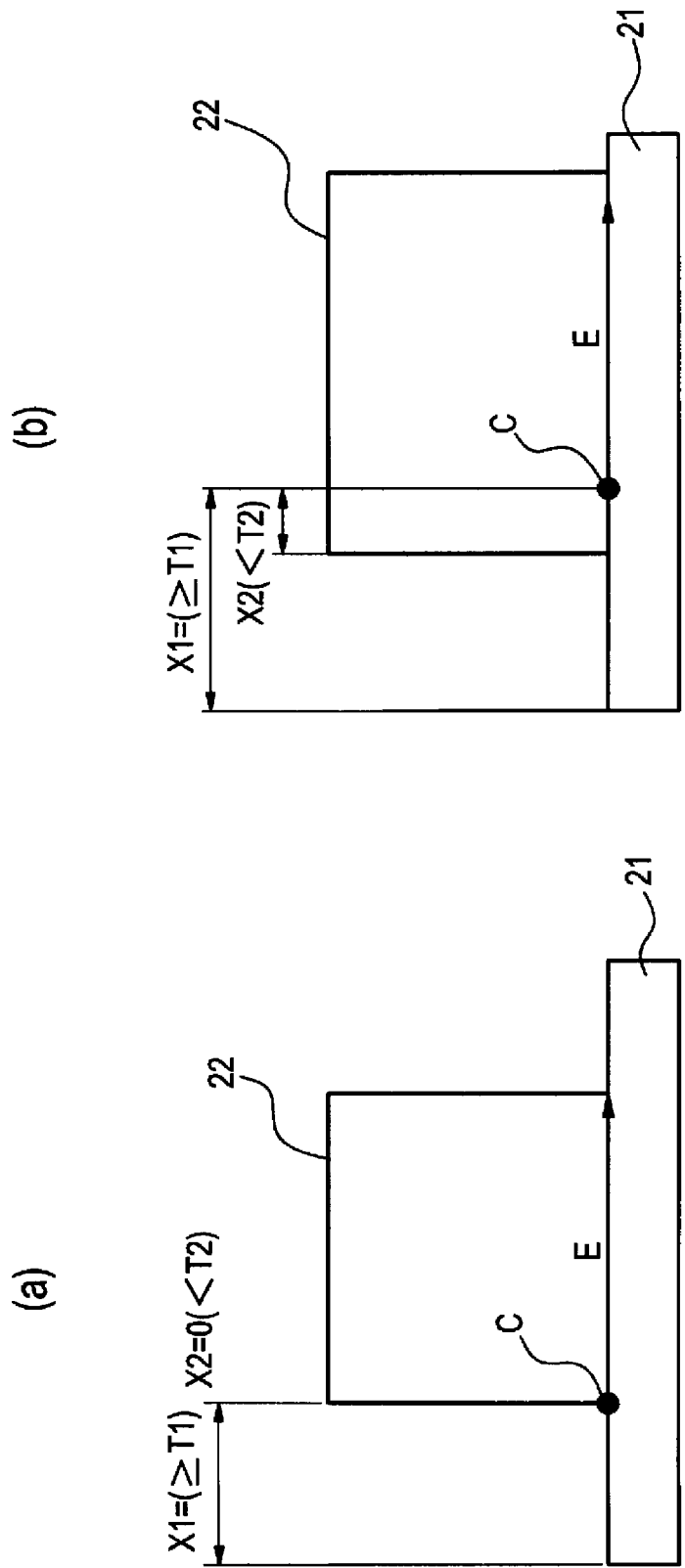
FIG. 9 illustrates conceptual diagrams for toe end determination, (a) is an example in which a second distance X2 between the one end of the lower plate and the starting point is 0, and (b) is an example in which X2 is not shown.

FIG. 9 illustrates conceptual diagrams for toe end determination which is made after determination of none lower plate end is made (the first distance X1 is greater than or equal to the first predetermined value T1, X1≥T1) by the lower plate end determination illustrated in FIG. 8. The "toe end" means a state in which a positional relationship is satisfied such that one end of the standing plate 22 is sufficiently separated from one end of the lower plate 21 and is present within the major surface of the lower plate 21. In FIG. 9(a), one end of the standing plate 22 matches the starting point C which is a weld end, is sufficiently separated from one end of the lower plate 21, and is present within the major surface of the lower plate 21. In FIG. 9(b), one end of the standing plate 22 does not match the starting point C which is a weld end, is sufficiently separated from one end of the lower plate 21, and is present within the major surface of the lower plate 21.

After the lower plate end determination of FIG. 8, the control unit 16 measures a second distance X2 between one end of standing plate 22 and the starting point C which is a weld end. In the example of FIG. 9(a), X2=0, and in FIG. 9(b), X2 is illustrated. In either example, the second distance X2 is smaller than a second predetermined value T2 (X2<T2). In this case, the control unit 16 makes the toe end determination that one end of the standing plate 22 is considered to be present within a range in a predetermined distance from one end of the lower plate 21. Here, X1>T1 and X2<T2 are satisfied.

Figure 10:
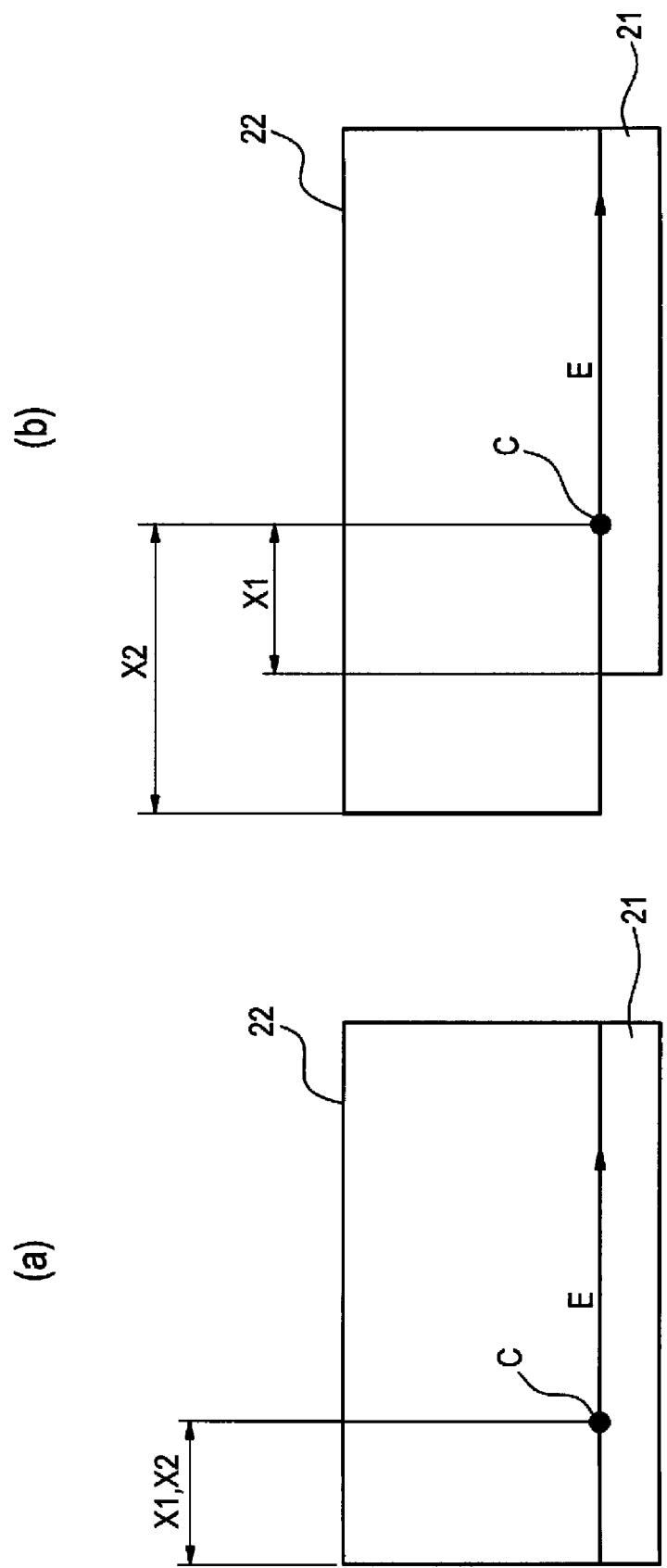
FIG. 10 illustrates conceptual diagrams for continuation determination, (a) illustrates an example in which the one end of the standing plate and the one end of the lower plate overlap, and (b) illustrates an example in which the one end of the standing plate is sufficiently separated from the one end of the lower plate.

FIG. 10 illustrates conceptual diagrams for continuation determination which is made after determination of none toe end is made (the second distance X2 is greater than or equal to the second predetermined value T2, X2≥T2) by the toe end determination illustrated in FIG. 9. That is, a state of none lower plate end and none toe end is achieved, the first distance X1 is greater than or equal to the first predetermined value T1, and the second distance X2 is greater than or equal to the second predetermined value T2 (X1≥T1 and X2≥T2 are satisfied). In FIG. 10(a), one end of the standing plate 22 and one end of the lower plate 21 overlap, and in FIG. 10(b), one end of the standing plate 22 is sufficiently separated from one end of the lower plate 21. In this case, the control unit 16 does not make the lower plate end determination and the toe end determination. This state means a state in which the weld end of a starting point or an ending point is present at a position sufficiently separated from one end of the lower plate 21 or the standing plate 22. In this case, the state means that a weld pass is divided into multiple weld passes, the welding robot 1 performs welding by repeating multiple welding operations, and welding work is further continued at a starting point or an ending point.

Although the toe end determination illustrated in FIG. 9 is made after the lower plate end determination illustrated in FIG. 8, the toe end determination is not necessarily made after the lower plate end determination, and may be directly made after the wall surface determination (FIGS. 5, 6).

Figure 11:
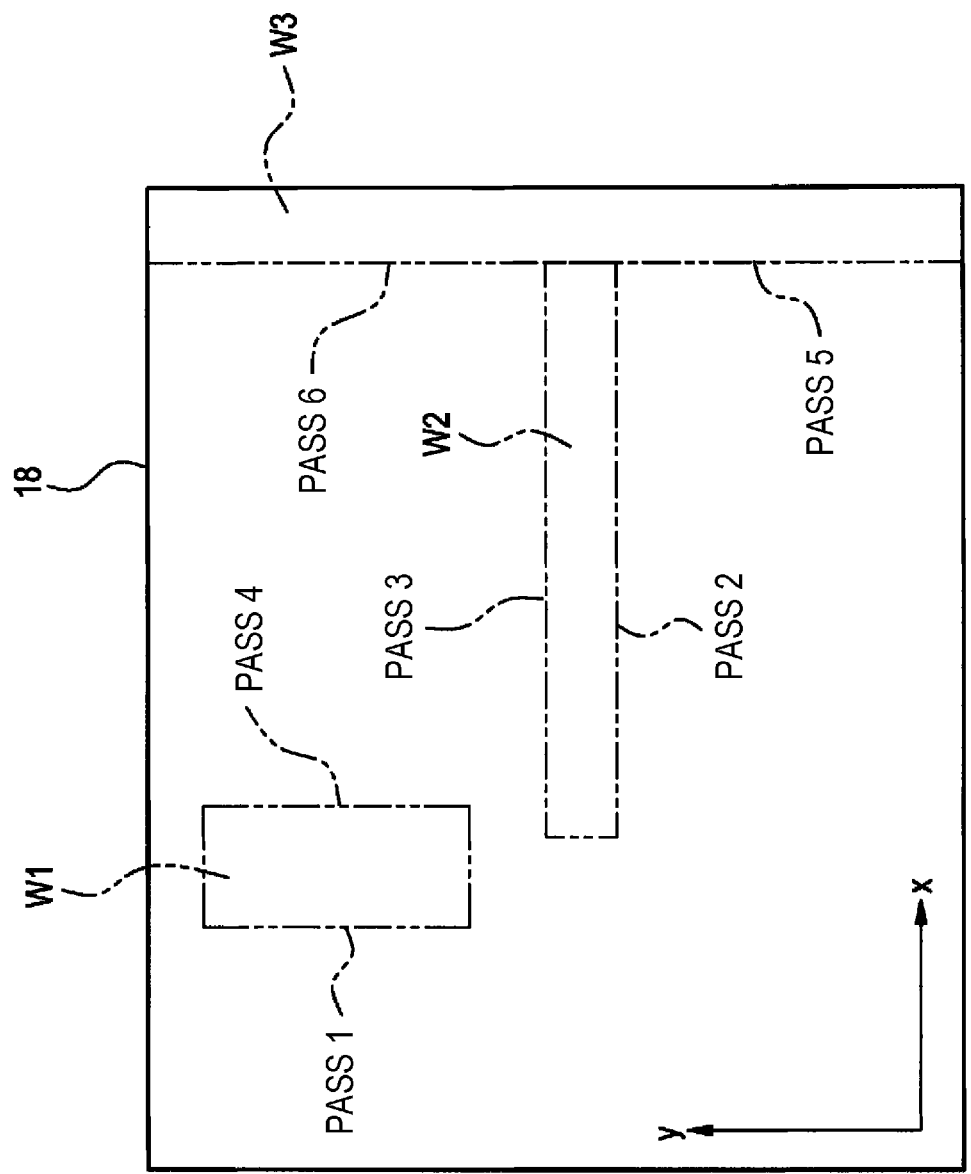
FIG. 11 is a conceptual diagram illustrating a situation where a base material is disposed under a welding robot 1, and multiple members to be welded are disposed on a plane of the base material and welded.

FIG. 11 illustrates a situation where a base material 18 is disposed under the welding robot 1 of FIG. 1, three members W1 to W3 to be welded are disposed on the surface (plane) of the xy coordinates of the base material 18, and are welded. To weld the members W1 to W3 to be welded, six multiple weld passes, path 1 to path 6 are necessary. After extracting these weld passes, the control unit 16 determines an optimal welding order of the weld passes from the relative positions of the weld passes. Processing to assign a corresponding number of a welding robot is performed according to the welding order. The table 1 below shows a welding order of the weld passes and the number of a welding robot which takes charge of welding in each of the cases where there is one welding robot (the number of robots=1), and there are two robots (the number of robots≥2).

TABLE 1

| NUMBER FOR WELD PASS | NUMBER OF ROBOTS = 1 | | NUMBER OF ROBOTS ≥ 2 | |
|---|---|---|---|---|
| | WELDING ORDER | NUMBER FOR ROBOT | WELDING ORDER | NUMBER FOR ROBOT |
| 1 | 1 | 1 | 1 | 1 |
| 2 | 2 | 1 | 2 | 2 |
| 3 | 3 | 1 | 2 | 1 |
| 4 | 4 | 1 | 1 | 2 |
| 5 | 5 | 1 | 3 | 1 |
| 6 | 6 | 1 | 4 | 1 |

The welding robot 1 as illustrated in FIG. 1 is a twin welding robot device having two welding torches with a welding torch provided in each of two manipulators 8. When each welding torch is considered to be one welding robot, it can be said that the welding robot 1 of FIG. 1 satisfies the condition of (the number of robots≥2). Thus, an optimal welding order can be achieved by assigning the number of each welding torch to welding for each weld pass.

Figure 12:
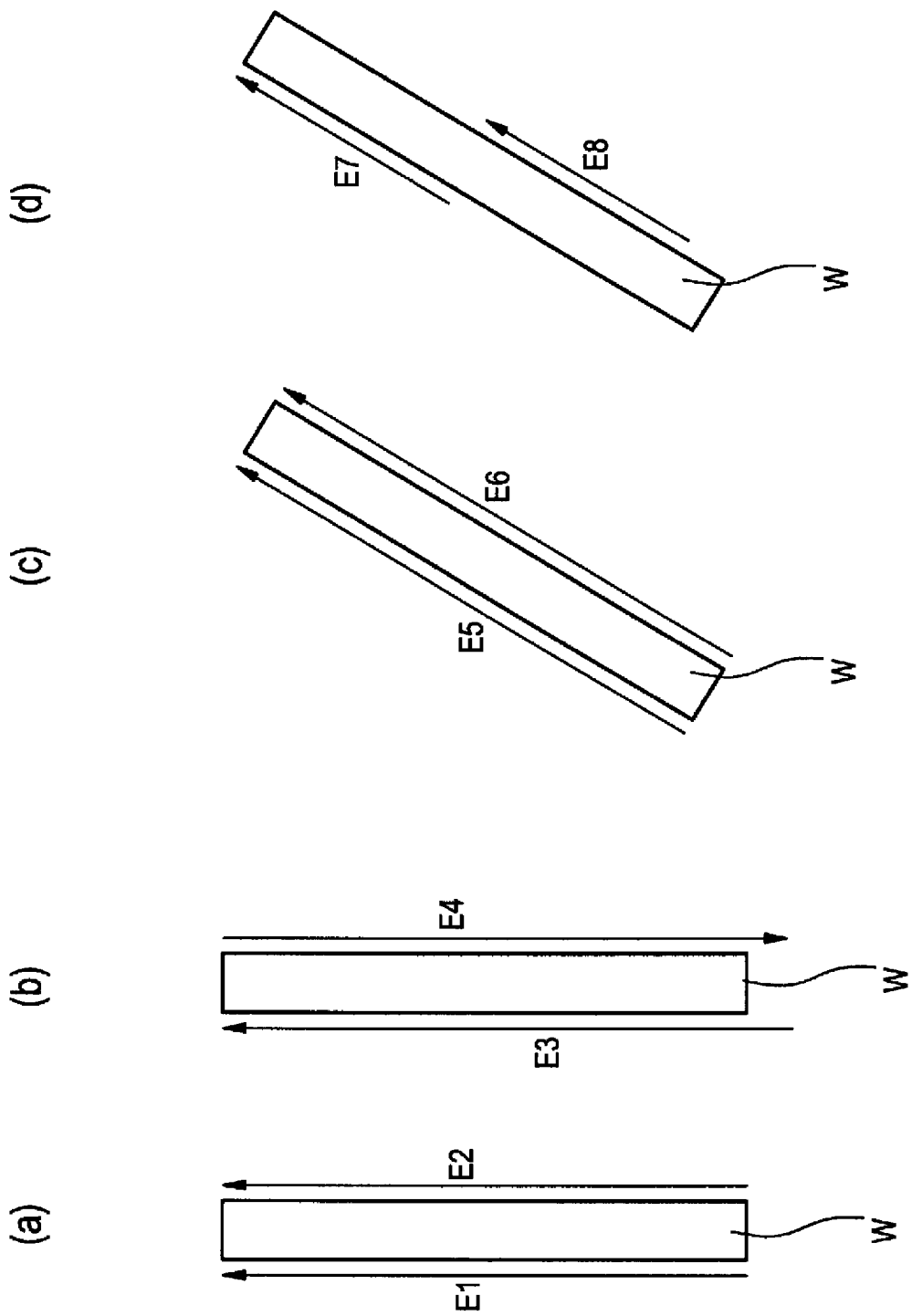
FIG. 12 provides views illustrating the concept of pair determination of a weld pass, (a), (c) illustrate an example in which requirements for a pair are met, and (b), (d) illustrate an example in which requirements for a pair are not met.

Also, as illustrated in FIG. 12, it is also possible for the control unit 16 to determine whether or not the weld pass constitutes a set of pairs by at least two sub-weld passes forming a pair. Whether or not the requirement for pair is satisfied is determined, for instance, by whether or not two weld passes satisfy all the following requirements 1 to 6.

1. The two weld passes have a relationship between the front and the back of one standing plate.
2. The vectors (direction and length) of the two weld passes are the same.
3. The two weld passes have a positional relationship of line object with respect to an intermediate line of one standing plate.

4. The welding posture, joint shape, groove shape, starting-side end shape, and ending-side end shape of the two weld passes are the same.

5. In the object positional relationship of the condition 3, the values (absolute values) of "offset", "parallel shift" are the same (symmetric).

6. The orientations of the welding torches are objects (a pair of the right and the left).

The weld passes E1, E2 of FIG. 12(a) satisfy the requirements for pair, and the weld passes E3, E4 of (b) do not satisfy the requirements for pair. The weld passes E5, E6 of FIG. 12(c) satisfy the requirements for pair, and the weld passes E7, E8 of (d) do not satisfy the requirements for pair. For two weld passes satisfying foreseeing of a welding pair, the control unit 16 performs welding at the same time, and can aim to achieve reduction of welding work and time shortening.

Figure 13:
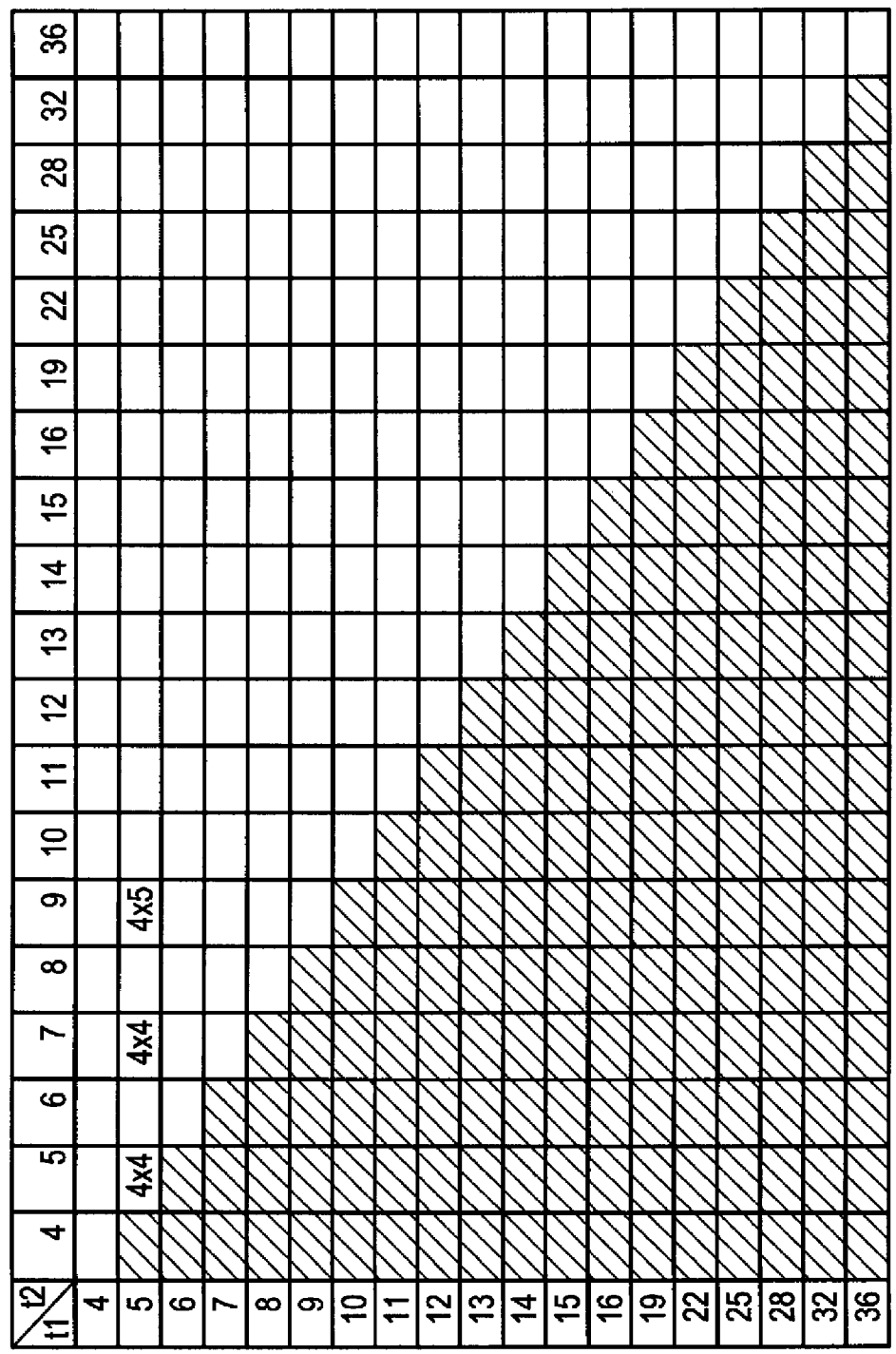
FIG. 13 illustrates part of a table (leg length rule file) which is used when the leg length of a fillet between two members to be welded is determined.

FIG. 13 illustrates part of a table (leg length rule file) which is used when the leg length of a fillet between two members to be welded as the welding objects is determined. In particular, when the two members to be welded are the lower plate 21 positioned horizontally, and the standing plate 22 with one plate thickness surface 22a welded to the major surface 21a of the lower plate 21 illustrated in FIG. 3, the control unit 16 provides the leg length of the fillet in the weld pass E based on the thickness of the lower plate 21 and the thickness of the standing plate 22. In the table (leg length rule file) of FIG. 13, the leg length of an appropriate fillet with the thickness t1 of the standing plate and the thickness t2 of the lower plate each given has been set in advance. The values of t1, t2 are given for every mm, and the numerical value is a lower limit for every mm. For instance, when the thickness t1 of the standing plate is 5.5 mm, and the thickness t2 of the lower plate is 7.5 mm, the combination is an appropriate combination which agrees with the leg length rule of the table, and the control unit 16 extracts and provides the leg length "4 mm×4 mm" in the table. Similarly, when the thickness t1 of the standing plate is 5.5 mm, and the thickness t2 of the lower plate is 5 mm, the leg length is 4 mm×4 mm, and when the thickness t1 of the standing plate is 5.5 mm, and the thickness t2 of the lower plate is 9 mm, the leg length is 4 mm×5 mm. When the values of t1, t2 inputted have a combination not found in the table, the control unit 16 determines that the combination is an inappropriate one, and does not present a leg length, then the control device 15 copes with the situation, for instance, issues some warnings.

FIG. 14 is a table which shows the concept of determining an orientation of two members to be welded as the welding objects with respect to welding torches. In particular, when the two members to be welded are the lower plate 21 positioned horizontally, and the standing plate 22 with one plate thickness surface 22a welded to the major surface 21a of the lower plate 21 illustrated in FIG. 3, the control unit 16 determines whether the standing plate 22 is present on the left side or the right side with respect to the welding direction of the weld pass E. Here, when the standing plate 22 is present on the left side with respect to the movement direction (welding direction) of a welding torch, the torch orientation is defined as "left wall", and when the standing plate 22 is present on the right side with respect to the movement direction (welding direction) of a welding torch, the torch orientation is defined as "right wall".

Specifically, after obtaining the orientation vector (the orientation of the starting point→the ending point) of the weld pass E, the control unit 16 obtains the normal vector of the major surface of the lower plate 21, and calculates the outer product between the normal vector and the orientation vector of the weld pass E. In addition, the control unit 16 obtains the normal vector of the standing plate 22, and compares the normal vector with the calculated outer product, thereby determining the torch orientation of the standing plate 22. A determination result is as shown in the following table.

TABLE 2

| NORMAL VECTOR OF STANDING PLATE AND OUTER PRODUCT | TORCH ORIENTATION |
| --- | --- |
| SAME | LEFT WALL |
| REVERSED | RIGHT WALL |

The welding robot system 100 of the embodiment has the welding robot 1 and a computer which is the control device 15. The computer which is the control device 15 teaches the welding robot 1 a predetermined operation. Here, the control device 15 as a computer extracts a weld pass for welding two members to be welded from 3D CAD data; prepares the wall surface determination model M1 having a predetermined 3D shape; positions the wall surface determination model M1 in a direction extending towards the outside of the weld pass with a weld end serving as a reference, the weld end being at least one of a starting point and an ending point of the weld pass; and determines whether or not a wall surface interferes with the positioned wall surface determination model M1, the wall surface being demarcated by another member different from the two members to be welded. The control device 15 teaches the welding robot 1 the weld pass obtained in such steps. Since the welding robot system 100 acquires weld pass information in advance related to information on an object which may interfere with a welding operation, and performs the welding operation in consideration of the information, it is possible to improve the efficiency of the welding operation, and increase the accuracy, and the quality of welding.

Although the present invention has been described above using the embodiment, the technical scope of the present invention is not limited to the above-described embodiment. It is apparent to those skilled in the art that various modifications may be made and alternative forms of implementation may be adopted without departing from the spirit and the scope of the present invention.

The present application is based on Japanese Patent Application No. 2017-054687 filed on Mar. 21, 2017, and the contents of this application are incorporated herein by reference.

REFERENCE SIGNS LIST

1 Welding robot
15 Control device (computer)
16 Control unit
17 Robot pendant
21 Lower plate (member to be welded)
22 Standing plate (member to be welded)
100 Welding robot system
M1 Wall surface determination model
M2 Scallop presence/absence determination model
W Member to be welded

The invention claimed is:

1. A method for acquiring weld pass information pertaining to execution conditions for a weld pass for welding two members to be welded which are welding objects of a welding robot, the method comprising:

extracting a weld pass for welding the two members to be welded from 3D CAD data;

preparing a wall surface determination model having a predetermined 3D shape;

positioning the wall surface determination model in a direction extending towards an outside of the weld pass with a weld end serving as a reference, the weld end being at least one of a starting point and an ending point of the weld pass;

determining whether or not a wall surface interferes with the positioned wall surface determination model, the wall surface being by another member that is not one of the two members to be welded, wherein when it is determined that the wall surface interferes with the wall surface determination model, the method comprises:

preparing a scallop presence/absence determination model having a predetermined 3D shape is prepared for determining whether or not a scallop that penetrates the wall surface is present;

positioning the scallop presence/absence determination model on a side on which the wall surface is present with the weld end serving as a reference; and determining whether or not the wall surface interferes with the positioned scallop presence/absence determination model; and outputting the weld pass to the weld robot, the weld pass being modified when the wall surface is determined to interfere with the positioned scallop presence/absence determination model.

2. The method for acquiring weld pass information according to claim 1, wherein the two members to be welded are a lower plate positioned horizontally and a standing plate having one plate thickness surface welded to a major surface of the lower plate, and the method comprises:

measuring a first distance between one end of the lower plate and the weld end; and making, when the first distance is smaller than a first predetermined value, a lower plate end determination that the one end of the lower plate is considered to match one end of the standing plate.

3. The method for acquiring weld pass information according to claim 2, wherein the method comprises:

measuring, when the first distance is greater than or equal to the first predetermined value, a second distance between the one end of the standing plate and the weld end; and making, when the second distance is smaller than a second predetermined value, a toe end determination that the one end of the standing plate is considered to be present within a range in a predetermined distance from the one end of the lower plate.

4. The method for acquiring weld pass information according to claim 3, wherein when the first distance is greater than or equal to the first predetermined value and the second distance is greater than or equal to the second predetermined value, the lower plate end determination and the toe end determination are not made.

5. The method for acquiring weld pass information according to claim 1, wherein the two members to be welded are a lower plate positioned horizontally and a standing plate having one plate thickness surface welded to a major surface of the lower plate, and the method comprises:

measuring a second distance between one end of the standing plate and the weld end; and making, when the second distance is smaller than a second predetermined value, a toe end determination that the one end of the standing plate is considered to be present within a range in a predetermined distance from the one end of the lower plate.

6. The method for acquiring weld pass information according to claim 1, wherein the method comprises:

extracting multiple weld passes;

determining a welding order of the weld passes from relative positions of the weld passes; and assigning a number of a corresponding welding robot according to the order of welding.

7. The method for acquiring weld pass information according to claim 1, wherein the two members to be welded are a lower plate positioned horizontally and a standing plate having one plate thickness surface welded to a major surface of the lower plate, and the method comprises providing a leg length of a fillet in the weld pass based on a thickness of the lower plate and a thickness of the standing plate.

8. The method for acquiring weld pass information according to claim 1, wherein the two members to be welded are a lower plate positioned horizontally and a standing plate having one plate thickness surface welded to a major surface of the lower plate, and the method comprises determining whether the standing plate is present on a left side or a right side with respect to a welding direction of the weld pass.

9. The method for acquiring weld pass information according to claim 1, further comprising determining whether or not the weld pass forms a set of pairs by at least two sub-weld passes as a pair.

10. A non-transitory computer readable medium storing thereon instructions that when executed by a computer cause the computer to execute the method for acquiring weld pass information according to claim 1.

11. A non-transitory computer readable medium storing thereon instructions that when executed by a computer cause the computer to execute a method for outputting to a welding robot a weld pass acquired by the method for acquiring weld pass information according to claim 1.

12. A welding robot system comprising:

a welding robot that welds a member to be welded; and circuitry that controls an operation of the welding robot in accordance with a predetermined operating program, wherein the circuitry is configured to extract a weld pass for welding two members to be welded from 3D CAD data, prepare a wall surface determination model having a predetermined 3D shape, position the wall surface determination model in a direction extending towards an outside of the weld pass with a weld end serving as a reference, the weld end being at least one of a starting point and an ending point of the weld pass, determine whether or not a wall surface interferes with the positioned wall surface determination model, the wall surface being another member that is not one of the two members to be welded, wherein, when it is determined that the wall surface interferes with the wall surface determination model, the circuitry is configured to:

prepare a scallop presence/absence determination model having a predetermined 3D shape is prepared for determining whether or not a scallop which penetrates the wall surface;

position the scallop presence/absence determination model on a side on which the wall surface is present with the weld end serving as a reference; and determine whether or not the wall surface interferes with the positioned scallop presence/absence determination model; and output to the welding robot the weld pass, the weld pass being modified when the wall surface is determined to interfere with the positioned scallop presence/absence determination model.

* * * * *